United States Patent [19]
Hashimoto

[11] Patent Number: 5,596,143
[45] Date of Patent: Jan. 21, 1997

[54] INSTRUMENT

[75] Inventor: Shinichi Hashimoto, Takahama, Japan

[73] Assignee: Nippondenso Co., Ltd., Kariya, Japan

[21] Appl. No.: 558,193

[22] Filed: Nov. 15, 1995

[30] Foreign Application Priority Data

Dec. 9, 1994 [JP] Japan .................. 6-306129

[51] Int. Cl.$^6$ .................................. B44F 1/00
[52] U.S. Cl. ............................. 73/431; 359/613
[58] Field of Search .................. 73/431, 866.3; 296/97.2, 97.7; D12/192; 359/609, 613, 614

[56] References Cited

U.S. PATENT DOCUMENTS 2,683,498  7/1954  Schaack ........................... 359/613
3,652,370  3/1972  Motal ............................. 359/614

FOREIGN PATENT DOCUMENTS 56-122913  9/1981  Japan .
61-151427  7/1986  Japan .
5-000441   1/1993  Japan .

*Primary Examiner*—Robert Raevis
*Attorney, Agent, or Firm*—Cushman, Darby & Cushman IP Group of Pillsbury Madison & Sutro LLP

[57] ABSTRACT

An instrument having a front cover which can be easily cleaned when dust and dirt adhere on the front surface of the instrument cover. The front cover has a toothed surface for reducing light reflection at the central portion of the front cover, and a smoothed fringe surface around the toothed surface which has an area for accepting a piece of wiping cloth. When dust and dirt accumulate in the toothed surface, they can be wiped off by a piece of cloth easily.

9 Claims, 6 Drawing Sheets

INSTRUMENT

CROSS REFERENCE TO RELATED APPLICATION

This application is based upon and claims priority from Japanese Patent Application No. 6-306129 filed on Dec. 9, 1994 incorporated herein by reference.

BACKGROUND OF THE INVENTION

1. Field of the Invention

The present invention relates to an instrument, to be more specific, an instrument having an improved instrument cover disposed on the front surface of the instrument.

2. Description of Related Art

Conventionally, in an instrument for a vehicle, as disclosed in Japanese Patent Laid-Open Publication Nos. Sho 56-122913 and 61-151427, at least a front surface of the instrument cover is formed to have a toothed surface, in order to prevent gleaming.

However, since the entire front surface of the instrument cover has a fine toothed sectional surface, it is difficult to remove dust or dirt adhering on the front surface which lowers transparency of the instrument panel, indicators, and other instruments behind the instrument cover.

SUMMARY OF THE INVENTION

In view of the above-mentioned problem, a main object of the present invention is to provide an instrument having an instrument cover which can be easily cleaned when dust and dirt adhere on the front surface of the instrument cover.

Another object of the present invention is to provide an instrument wherein an instrument cover has a central portion having a toothed front surface, and a fringe portion having a smoothed surface at least on a part around the central portion.

Another object of the present invention is to provide an instrument wherein the smoothed fringe portion surrounds the toothed front surface continuously.

A further object of the present invention is to provide an instrument wherein the smoothed fringe portion is dark colored.

A further object of the present invention is to provide an instrument wherein the smoothed fringe portion inclines rearward from the toothed central portion.

In an instrument according to the present invention as constructed above, when dust and dirt deposited in ditches formed on the central portion having a toothed front surface, they can be easily removed by a piece of cloth pushing out toward the fringe portion from the toothed ditches while keeping the piece of cloth in contact with the toothed ditches. Thus, transparency of the instrument cover will be kept unchanged. Dial plates and indicators are normally placed on portions deep inside the instrument cover corresponding to the central portion of cover and not corresponding to the fringe portion of the instrument cover. Therefore, even if the front surface of the fringe portion is smooth, it will not cause any problem of gleaming of the instrument cover.

When dust accumulates on the fringe portion of the instrument cover, the dust can be much more easily removed if the fringe portion has a continuous flat surface.

If the fringe portion has a dark-color treatment, which is painted with a dark color paint or is made of dark-colored material, light reflection on the fringe portion can be prevented.

If the fringe portion inclines rearward, it can prevent a reflected image on the fringe portion from dazzling the eyes of a driver.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

The preferred embodiments of the present invention are hereinafter described with reference to the accompanying drawings.

Figure 1:
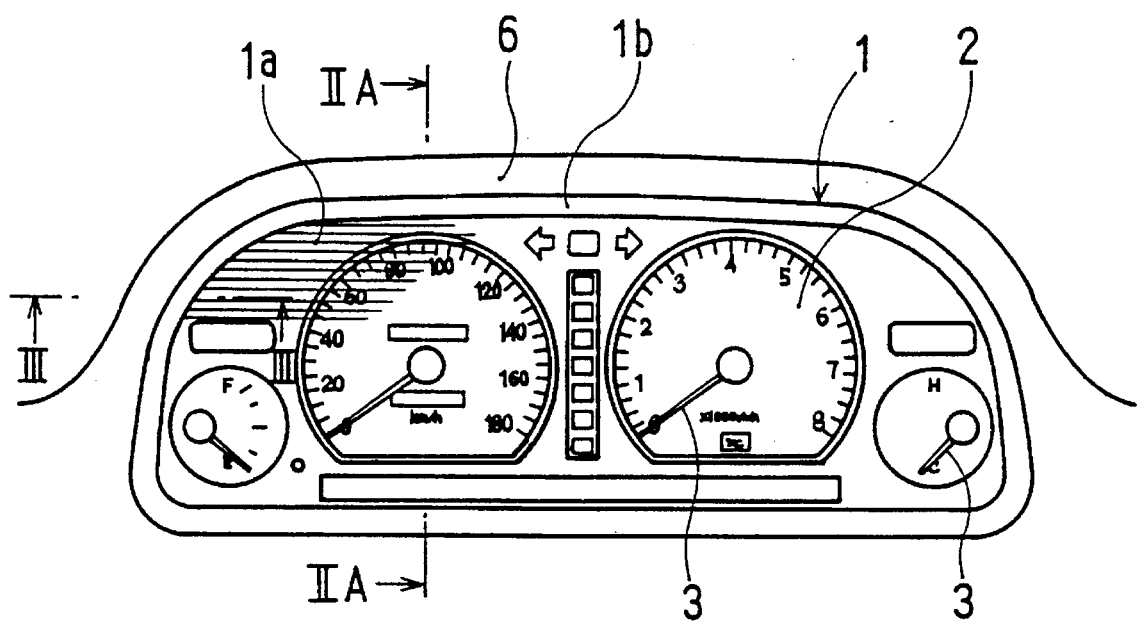
FIG. 1 is a front view illustrating an automobile instrument according to a first embodiment.
Figure 2A:
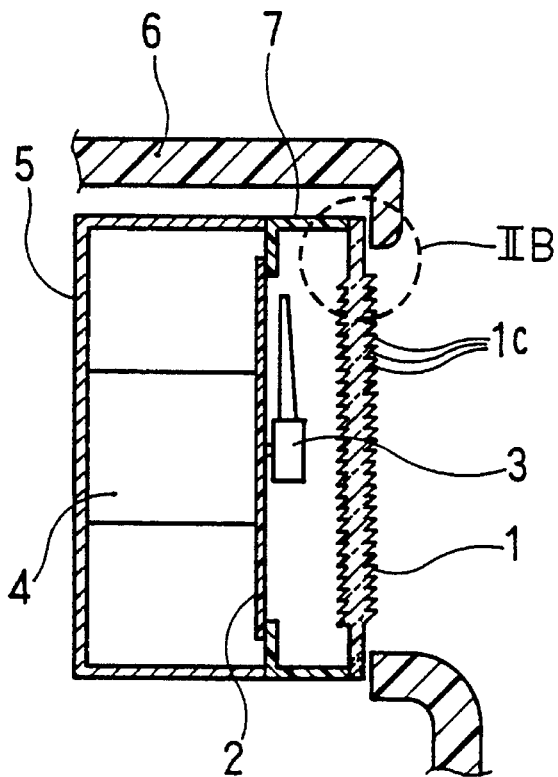
FIG. 2A is a cross-sectional view illustrating a portion cut along lines IIA—IIA in FIG. 1.
Figure 2B:
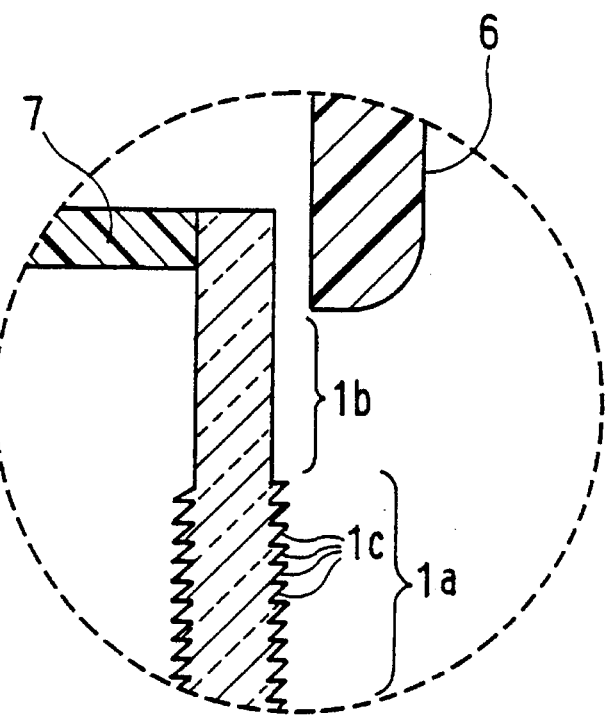
FIG. 2B is a enlarged view of a portion encircled by a broken line IIB in FIG. 2A.
Figure 3:
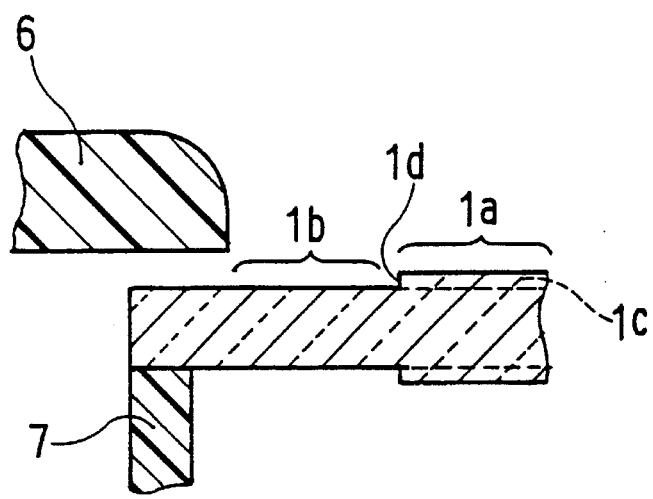
FIG. 3 is a cross-sectional view of a portion cut along lines III—III in FIG. 1.

In FIGS. 1 through 3, the front surface of the instrument has an instrument cover 1 molded from transparent resin (for instance, a molded product of acrylic resin). The front surface of the instrument cover 1 is composed of a central portion 1a having a fine-toothed surface (which has tooth wave cross-section), and a smoothed (without toothed surface) fringe portion 1b surrounding the central portion 1a entirely. The fringe portion 1b is wider than a ditch 1c of the toothed surface and preferably wide enough to accommodate a piece of wiping cloth. A dial plate 2 molded from transparent resin such as polycarbonate on which designs are printed and indicators 3 are placed deep inside the instrument cover 1. However, the designs and the indicators are located on portions corresponding to the central portion of the instrument cover, and not corresponding to the fringe portion 1*b*. A reference numeral 4 represents an internal driving unit which drives the indicator 3. A reference numeral 5 represents a case molded from resin such as polypropylene (PP), a reference numeral 6 represents a hood installed on a vehicle, and a reference numeral 7 represents a black facing plate molded from resin such as ABS or PP.

In an instrument having the above-mentioned structure, the dust and the dirt accumulated in toothed ditches 1*c* of the central portion 1*a* on the front surface of the instrument cover 1 can be easily removed by a piece of cloth in contact with the toothed ditches 1*c* pushing out toward the fringe portion 1*b* from the toothed ditches 1*c* horizontally. Thus, degradation of the transparency of the instrument cover 1 is prevented.

According to the instrument described above, portions such as a dial plate and indicators are normally placed deep inside the instrument cover 1 on portions corresponding to the central portion 1*a*, and not corresponding to the fringe portion 1*b* of the instrument cover 1. Therefore, even if the front surface of the fringe portion 1*b* is smooth, it will not cause any problem of gleaming on the instrument cover 1 to a driver looking at the dial plate or the indicators.

Figure 4:
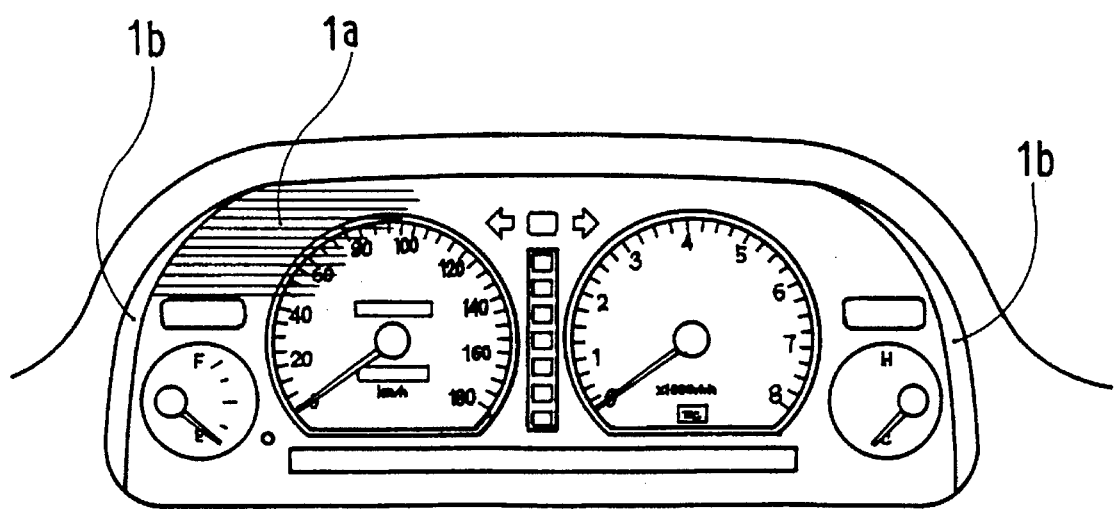
FIG. 4 is a front view illustrating an automobile instrument according to a second embodiment of the present invention.

In the above embodiment, the fringe portion 1*b* surrounds the central portion 1*a* entirely. However, as shown in FIG. 4, the fringe portion 1*b* can be formed only at the right and left sides of the central portion 1*a*.

Figure 5:
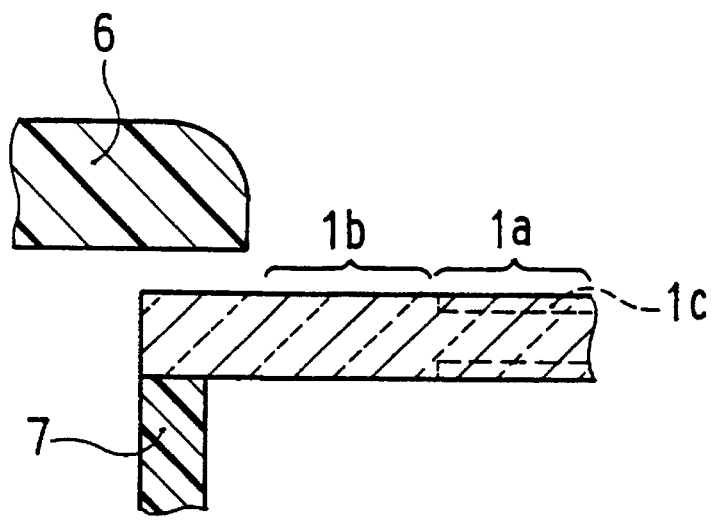
FIG. 5 is a cross-sectional view illustrating a main portion of an automobile instrument according to a third embodiment of the present invention.
Figure 6:
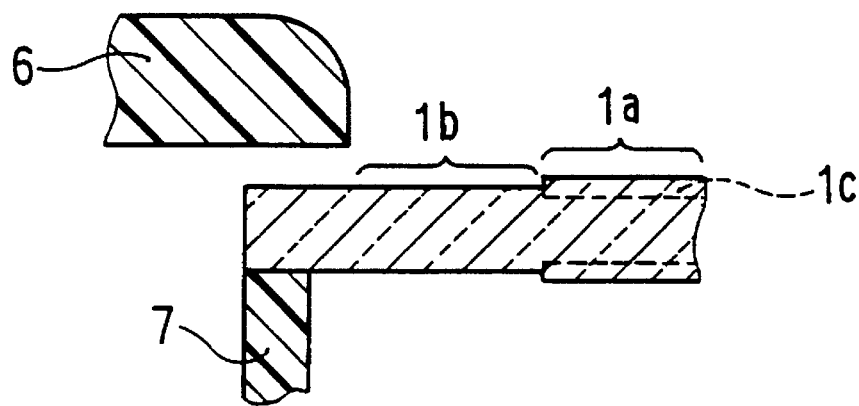
FIG. 6 is a cross-sectional view illustrating a main portion of an automobile instrument according to a fourth embodiment of the present invention.

In the above embodiment, as shown in FIG. 3, the bottom of a ditch 1*c* of the toothed surface 1*a* and the smoothed plane of the fringe portion 1*b* are on the same level. However, as shown in FIG. 5, the top of the toothed surface of the central portion and the smoothed surface of the fringe portion 1*b* can be formed on the same level. As shown in FIG. 6, the smooth plane of the fringe portion 1*b* can be formed on the same level with the middle point between the top of the toothed surface and the bottom of the ditch 1*c*.

Figure 7:
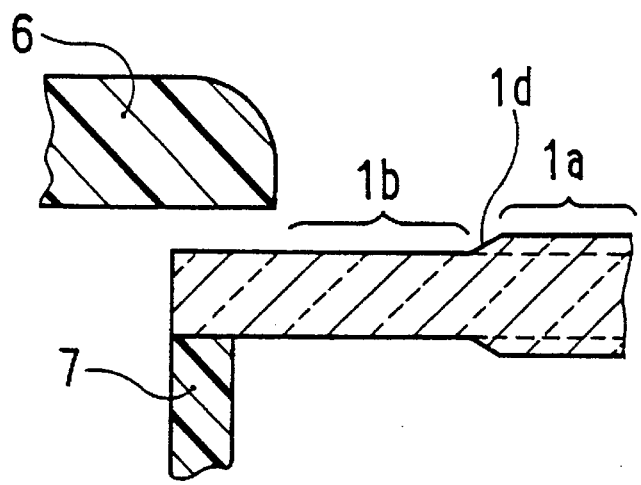
FIG. 7 is a cross-sectional view illustrating a main portion of an automobile instrument according to a fifth embodiment of the present invention.
Figure 8:
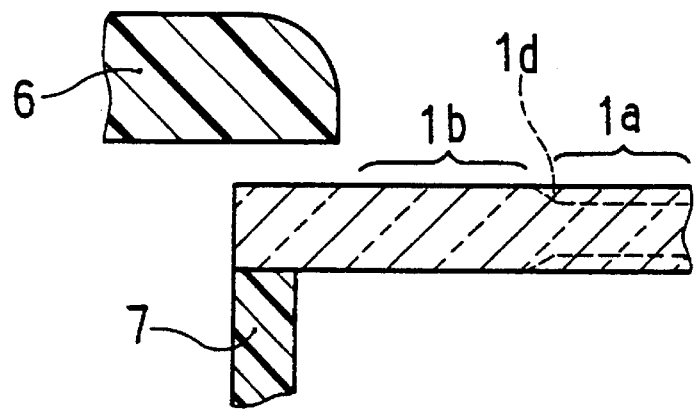
FIG. 8 is a cross-sectional view illustrating a main portion of an automobile instrument according to a sixth embodiment of the present invention.
Figure 9:
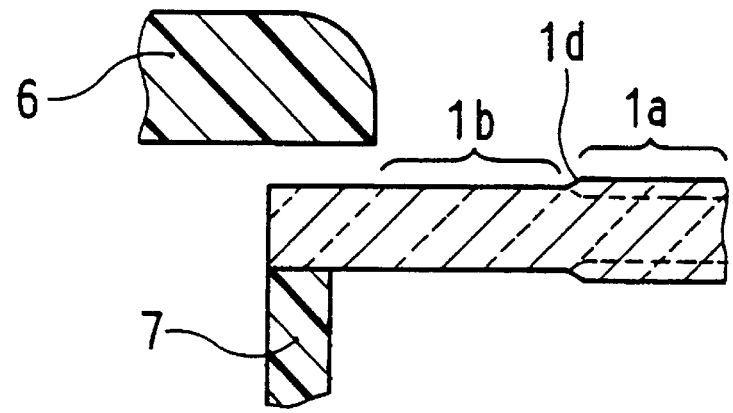
FIG. 9 is a cross-sectional view illustrating a main portion of an automobile instrument according to a seventh embodiment of the present invention.

The first embodiment shown in FIG. 3 has a step portion 1*d* between the central portion 1*a* and the fringe portion 1*b*. However, in instruments according to fifth, sixth and seventh embodiments shown in FIGS. 7, 8 and 9 respectively, the step portion 1*d* is replaced with a sloped portion. In this case, dust and dirt in the ditches 1*c* can be much more neatly removed.

Figure 10:
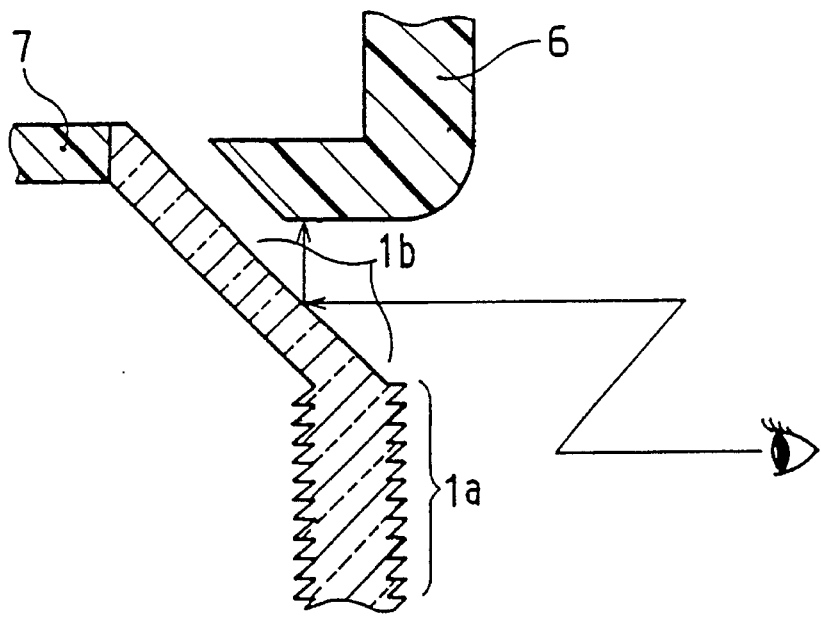
FIG. 10 is a cross-sectional view illustrating a main portion of an automobile instrument according to an eighth embodiment of the present invention.
Figure 11:
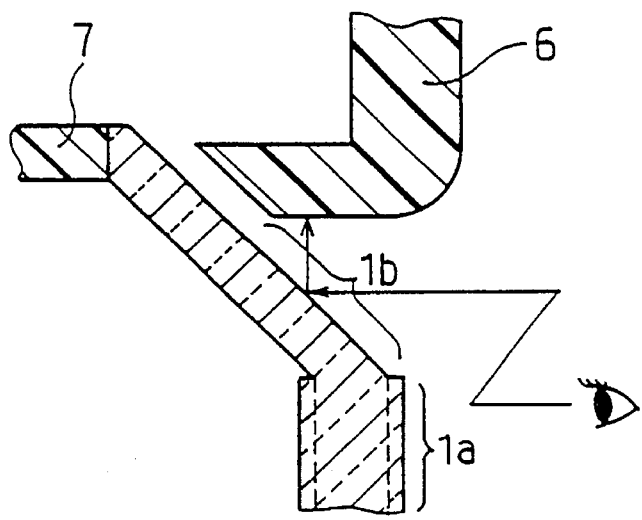
FIG. 11 is a cross-sectional view illustrating a main portion of an automobile instrument according to a ninth embodiment of the present invention.

In the first embodiment described with reference to FIG. 3, the fringe portion 1*b* extends straight from the central portion 1*a*. However, in instruments according to eighth and ninth embodiment as shown in FIGS. 10 and 11 respectively, the fringe portion 1*b* inclines rearward from the central portion 1*a*. In this case, it can prevent a reflected image on the fringe portion 1*b* from dazzling the eyes of a driver.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An instrument comprising:
   a dial plate, and
   a transparent front cover covering the dial plate,
   wherein said front cover comprises:
      a toothed central portion having a plurality of continuous ditches extending horizontally for reducing reflection of light; and
      a smoothed fringe portion having a width wider than one of said ditches and being disposed generally perpendicularly to said ditches
   said smoothed fringe portion being connected to said toothed central portion in such a manner so that dust or dirt accumulated in said ditches can be wiped off by a piece of cloth toward said smoothed fringe portion.

2. An instrument comprising:
   a dial plate, and
   a transparent front cover covering the dial plate,
   wherein said front cover comprises:
      a toothed central portion having a plurality of continuous ditches extending horizontally for reducing reflection of light; and
      a smoothed fringe portion continuously surrounding said central portion
   said smoothed fringe portion being connected to said toothed central portion in such a manner so that dust or dirt accumulated in said ditches can be wiped off by a piece of cloth toward said smoothed fringe portion.

3. An instrument according to claim 1 or 2, wherein said smoothed fringe portion comprises dark colored transparent material.

4. An instrument according to claim 1 or 2, wherein said smoothed fringe portion comprises a transparent portion inclining from said toothed central portion.

5. An instrument according to claim 1 or 2, wherein bottom of said ditches is disposed level with said smoothed portion.

6. An instrument according to claim 1 or 2, wherein top of said toothed portion is disposed level with said smoothed fringe portion and said connecting portion has inclined surfaces for connecting said bottom of said ditches and said smoothed fringe portion.

7. An instrument comprising:
   a case,
   a transparent front cover, and
   a dial plate disposed at a central portion of said case,
   wherein said front cover comprises:
      a toothed portion disposed at a central portion of said transparent front cover, said toothed portion having a plurality of continuous ditches extending horizontally for reducing reflection of light; and
      a smoothed portion disposed generally perpendicularly to said ditches, said smoothed portion having an area for accepting a piece of wiping cloth such that dirt or dust accumulated in said ditches may be moved with the cloth from the ditches to the smoothed portion.

8. An instrument according to claim 7, wherein bottom of said ditches is disposed level with said smoothed portion.

9. An instrument according to claim 7, wherein top of said toothed surface is disposed level with said smoothed portion and said connecting portion has inclined surfaces for connecting said bottom of said ditches and said smoothed fringe portion.

* * * * *